No. 748,155. PATENTED DEC. 29, 1903.
I. W. BEELER.
CHURN OPERATING MECHANISM.
APPLICATION FILED MAR. 26, 1903.
NO MODEL.
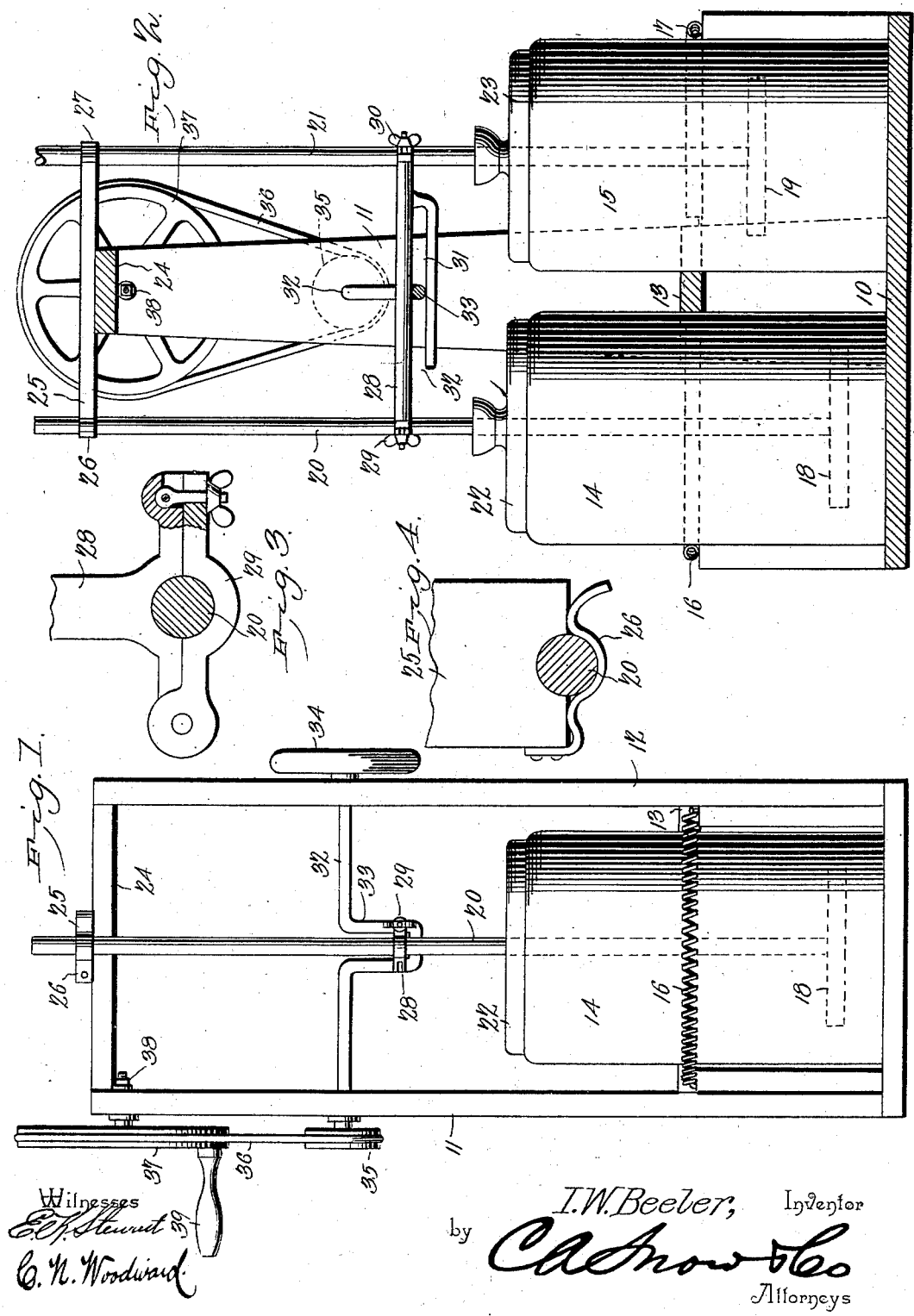
Witnesses
I. W. Beeler, Inventor
by C. A. Snow & Co.
Attorneys No. 748,155. Patented December 29, 1903.

UNITED STATES PATENT OFFICE.

ISAAC W. BEELER, OF MIAMI, INDIAN TERRITORY, ASSIGNOR OF ONE-FOURTH TO HENRY C. & MARY A. NICHOLSON, OF KANSAS CITY, MISSOURI.

CHURN-OPERATING MECHANISM.

SPECIFICATION forming part of Letters Patent No. 748,155, dated December 29, 1903.

Application filed March 26, 1903. Serial No. 149,756. (No model.)

*To all whom it may concern:*

Be it known that I, ISAAC W. BEELER, a citizen of the United States, residing at Miami, in the county of Ottawa, Indian Territory, have invented a new and useful Churn-Operating Mechanism, of which the following is a specification.

This invention relates to devices for operating churns and for similar purposes, and has for its object to simplify and improve the mechanism and to increase its efficiency; and the invention consists in certain novel features of construction, as hereinafter shown and described, and specified in the claims.

In the drawings illustrative of the invention, in which corresponding parts are denoted by like designating characters, Figure 1 is a front elevation, and Fig. 2 is a sectional side elevation, of the apparatus complete; Figs. 3 and 4, enlarged sectional details of the dasher-rod clamps.

The improved device consists of a supporting-frame comprising a base portion 10, provided with vertical spaced standards 11 12 and a transverse bracket 13, the latter spaced from the base and forming the lateral support for the churns, which are indicated at 14 15 and rest upon the base portion, as shown.

The churns will preferably be of glass and circular in outline, and the bracket portion 13 will be provided with recesses conforming to and supporting the churns at one side, as shown, the churns being held in place upon their other sides by elastic or yielding bands 16 17, as shown. These yielding bands are preferably in the form of coiled springs connected by one end to the frame and provided with means, such as hooks, at their other ends adapted to fit over pins, also upon the frame. By this simple means the churns are yieldably supported in position and easily removable when required.

The churn-dashers may be of any suitable or usual form, such as square blocks 18 19, with rods 20 21 extending therefrom, as shown. The churns will be provided with suitable covers, such as screw-caps 22 23, through which the rods pass, the caps forming guides for the rods. At their upper ends the standards 11 12 are connected by a transverse headpiece 24, and connected to this head member is a guide member 25, extending to and supporting the upper free ends of the dasher-rods, the rods being detachably connected to the guide member, as by yieldable clips, (indicated at 26 27.) The clips permit the rods to be thus connected to and disconnected from the guide member and at the same time permit them to move freely through the clips when the dasher-rod is operated. Extending between the rods 20 21 above the churns and beneath the guide member 25 is a bar 28, having detachable clamps 29 30 upon its ends, whereby it may be adjustably and detachably connected to the rods, the bar having a longitudinal slot 31 open at one end, as at 32'.

Transversely mounted for rotation in the standards 11 12 is a shaft 32, having a crank 33, operatively engaging the slot 31, as shown, and by rotating the shaft the dasher-rods will be moved vertically, as will be obvious.

The shaft 32 will be provided with a flywheel 34 upon one end and a belt-pinion 35 upon the other, the latter connected by a belt 36 to a driven pulley 37 upon a stub-shaft 38 on the standard 11 and provided with a handle 39. By this simple arrangement the shaft 32 will be rapidly rotated and the churn-dashers operated at a corresponding speed, the fly-wheel accelerating the motion and decreasing the power required and also regulating the movement and serving in some sense as a governor therefor. By this simple arrangement several important results are attained, to wit: First, the churn-dashers may be independently adjusted, so that the movement or "stroke" may take place at any point in the churn to adapt the motion to the condition of the cream or quantity in the churn, and the stroke may be confined to the lower part of the churn, to the upper part, or to any intermediate point, as will be obvious; second, the churn-dashers are easily and quickly detachable from the guide 25 and bar 28 when the churns are to be discharged or replenished and the bar 28 readily detachable from the crank by means of the open slot 31; third, the churns are yieldably supported by the elastic bands, which is an important feature when glass or otherwise fragile churns are employed.

The whole device is very simple, cheap, and easily operative and will be found very efficient for the purposes designated.

The device may be adapted to any size of churn and may be operated by any desired power.

Having thus described the invention, what I claim is—

1. In a device of the class described, a supporting-frame, spaced rods movable and operative in guides upon said frame, a slotted arm connected by its ends to said rods, and a shaft mounted for rotation upon said frame and having a crank operatively engaging said slotted arm, substantially as described.

2. In a device of the class described, a supporting-frame, spaced rods movable and operative through guides on said frame, a slotted bar extending between said rods and adjustably coupled by its ends thereto, and a shaft mounted for rotation upon said frame and having a crank operatively engaging said slotted arm, substantially as described.

3. In a churn-dasher-operating mechanism, a supporting-frame, spaced churns carried upon said frame, dashers operating within said churns and having dasher-rods extending therefrom, guides carried by said frame and supporting said rods movably, a slotted arm extending between said dasher-rods, independent clamping means connecting said arm adjustably to said dasher-rods, and a shaft mounted for rotation upon said frame and provided with a crank operatively engaging said slotted arm, whereby said churn-dashers may be operated and the location of the throw relative to the churns regulated, substantially as described.

4. In a device of the class described, a supporting-frame, spaced churns carried upon said frame, dashers operating in said churns and having rods extending therefrom, guides carried by said frame and detachably supporting said rods, an arm extending between said rods, and detachably connected thereto and provided with a longitudinal slot open at one end, and a shaft mounted for rotation upon said frame and having a crank detachably engaging said open slot, substantially as described.

In testimony that I claim the foregoing as my own I have hereto affixed my signature in the presence of two witnesses.

ISAAC W. BEELER.

Witnesses:
HALBERT H. McCLUER,
CHARLES D. GOODRUM.